(12) United States Patent
Lindquist et al.

(10) Patent No.: US 6,983,149 B2
(45) Date of Patent: Jan. 3, 2006

(54) METHOD FOR DETERMINING A MONITORED SET OF CELLS ASSOCIATED WITH AN ACTIVE SET OF CELLS

(75) Inventors: Thomas Lindquist, Möndal (SE); Anders Milén, Nacka (SE); Tobias Ljungström, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 10/496,030

(22) PCT Filed: Oct. 29, 2002

(86) PCT No.: PCT/SE02/01963

§ 371 (c)(1),
(2), (4) Date: May 19, 2004

(87) PCT Pub. No.: WO03/045104

PCT Pub. Date: May 30, 2003

(65) Prior Publication Data

US 2005/0009531 A1  Jan. 13, 2005

(30) Foreign Application Priority Data

Nov. 20, 2001 (SE) .................................. 0103873

(51) Int. Cl.
*H04Q 7/20* (2006.01)

(52) U.S. Cl. ...................... 455/436; 435/442; 435/525; 435/535.2

(58) Field of Classification Search ................ 455/434, 455/435–437, 525, 129.1, 438, 439, 442, 455/443, 452.1, 455, 456.1, 464
See application file for complete search history.

(56) References Cited

U.S. PATENT DOCUMENTS

| | | | |
|---|---|---|---|
| 5,428,816 A * | 6/1995 | Barnett et al. .............. 455/437 |
| 6,442,389 B1 * | 8/2002 | Marcum ..................... 455/437 |
| 6,917,809 B2 * | 7/2005 | Horwath et al. ............ 455/436 |
| 2003/0078043 A1 * | 4/2003 | Horwath et al. ............ 455/436 |
| 2004/0116110 A1 * | 6/2004 | Amerga et al. .......... 455/422.1 |
| 2004/0235478 A1 * | 11/2004 | Lindquist et al. ........... 455/440 |

\* cited by examiner

*Primary Examiner*—Sonny Trinh
(74) *Attorney, Agent, or Firm*—Roger Burleigh

(57) ABSTRACT

The present invention is related to cellular radio communication network and is a method for determining a Monitored set (MS) of cells associated with an Active set (AS) of cells by a particular ranking of the neighbouring cells associated with each of the cells in the Active set. A neighbouring cell list is created which contains for each active cell its neighbouring cells. These cells can be in a random order and can include other active cells. A scanning operation is done starting with the neighbouring cell (C12 or C31) on top of the list which belongs to the strongest active cell (C11), whereby this cell will be included in the Monitoring set if certain conditions (3,4; respectively, FIG. 4). Next, the list associated with the next strongest active cell (C12) is considered. This scanning is repeated until the maximum size of the Monitoring set has been reached.

7 Claims, 4 Drawing Sheets

FIG 3

Decreasing quality order →

Table 1

| Cell C11 in Act.Set | | Cell C12 in Act.Set | |
|---|---|---|---|
| C12 (Fig 2A) | C35 (Fig 2B) | C32 (Fig 2B) | C18 (Fig 2A) |
| C31 (Fig 2B) | C38 (Fig 2A) | C11 (Fig 2A) | C21 (Fig 2A) |
| C18 (Fig 2A) | C16 (Fig 2A) | C14 (Fig 2A) | C20 (Fig 2A) |
| C34 (Fig 2B) | ------ | C31 (Fig 2B) | ---- |
| C13 (Fig 2A) | | C13 (Fig 2A) | |
| C14 (Fig 2A) | | C34 (Fig 2A) | |
| C32 (Fig 2B) | | C33 (Fig 2B) | |

Table 2

| | |
|---|---|
| C31 | C32 |
| C18 | C14 |
| C34 | *C31* |
| C13 | *C13* |
| *C14* | *C34* |
| *C32* | C33 |
| C35 | *C18* |
| C38 | C21 |

Neighboring Set List
(after step 3 in Fig 4)

Table 3

| |
|---|
| C31 |
| C32 |
| C18 |
| C14 |
| C34 |
| C13 |
| C33 |
| C35 |
| C38 |
| C21 |

Resulting Monitored Set

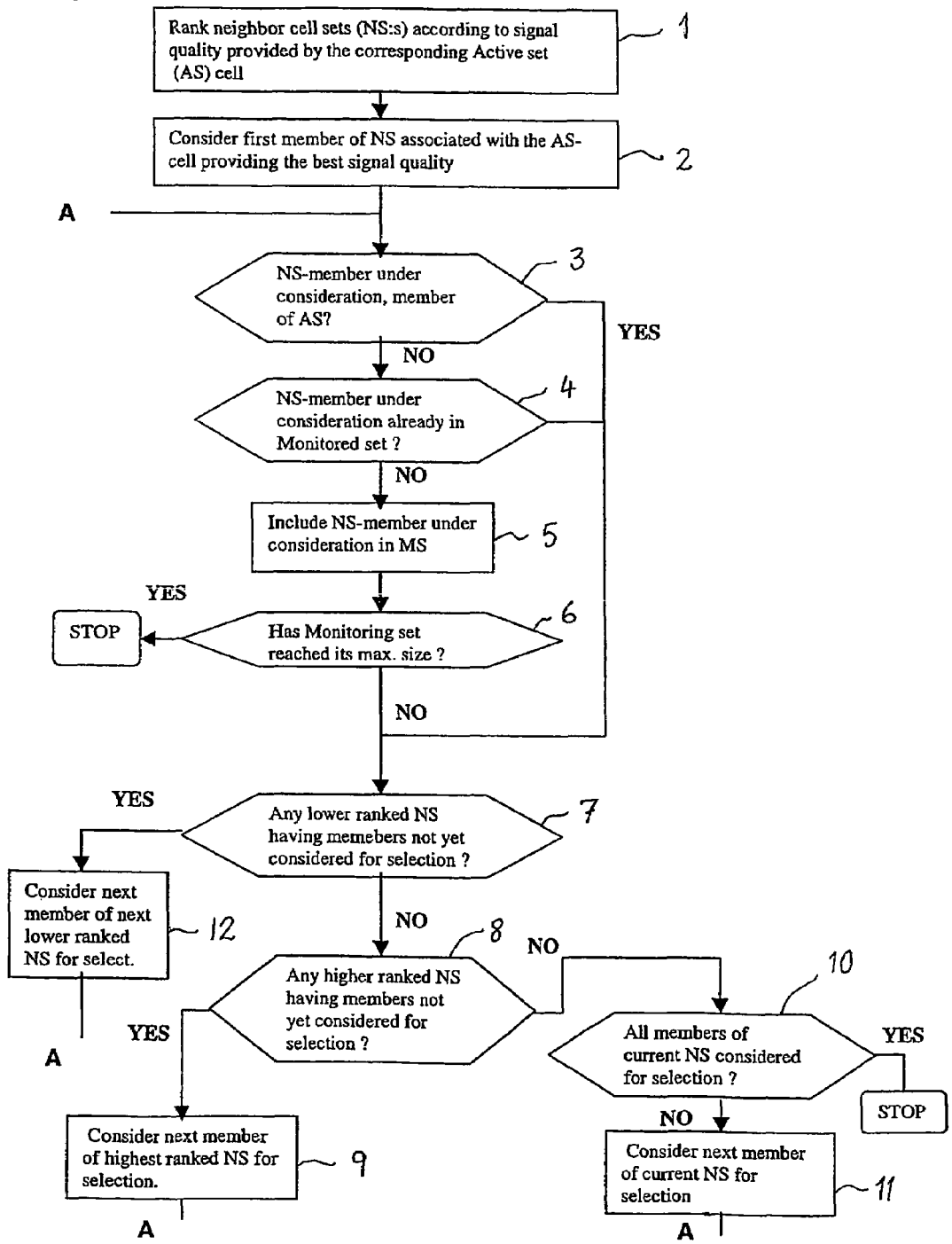

METHOD FOR DETERMINING A MONITORED SET OF CELLS ASSOCIATED WITH AN ACTIVE SET OF CELLS

TECHNICAL FIELD OF THE INVENTION

The present invention relates to a method in a cellular radio communication network. More in particular, the invention relates to a method for determining a Monitored set of cells associated with an Active set of cells by a particular ranking of neighbouring cells associated with each of the cells in the Active set.

DESCRIPTION OF RELATED ART

In a typical cellular radio communication system, a geographical area served by a cellular radio communication network is divided into cell areas in which radio base stations, also sometimes referred to as base transceiver stations, provide radio coverage to mobile stations operating in said cell areas. The mobile stations, which e.g. may be portable, pocket, hand-held or car mounted, enables mobile station users (mobile subscribers) to communicate voice, data and/or multimedia information via the cellular radio communication network. Each radio base station may be equipped to service one or more cells.

A mobile station may be assigned a radio communication channel dedicated for communication between the mobile station and the cellular network e.g. when receiving or making a phone call. In traditional cellular radio communication systems, such as e.g. Global System for Mobile communication (GSM), Personal Digital Cellular (PDC) and Digital Advanced Mobile Phone System (TDMA), he dedicated radio communication channel is served by a single cell referred to as the serving cell. During the phone call it may become necessary to serve the call using another cell e.g. due to the mobile station moving into an other cell. A new dedicated radio communication channel is then established in the other cell for serving the phone call, while the old dedicated radio communication channel is released. This process of changing dedicated radio communication channels during an ongoing call is referred to as handoff or handover. Due to there being a short interruption of communication as the mobile station switches from one dedicated radio communication channel to another, this type of handover is sometimes referred to as hard handover or "break before make".

In more recent cellular radio communication systems using so called Code Division Multiple Access (CDMA) technology, e.g. cdmaOne or IS-95 and the UTRAN FDD mode (also referred to as Wideband CDMA), a dedicated radio communication channel need not only be supported by a single serving cell at each given moment of time, but may on the contrary be supported by several cells using so called macrodiversity which provides increased radio transmission quality. The set of cells currently serving the dedicated communication channel is referred to as the Active set. Due to the possibility of using more than one cell to serve a dedicated radio communication channel, these cellular radio communication systems also enables so called soft handover, sometimes referred to as "make before break", wherein the mobile station continues to communicate with the cellular network via the old cell at least until the dedicated radio channel is established also in the new cell.

In order to support handover, both in traditional systems and systems using CDMA, mobile stations are required to perform measurements on downlink transmissions, i.e. from the cellular network to the mobile stations, in both the serving cell/Active set as well as neighbouring cells to the serving cell/Active set. The measurement results are reported back to the cellular network and are used for making decisions on which cell is best suited to serve the respective mobile station.

The mobile stations have limited capacity for performing the downlink measurements, thus if a mobile station is ordered to perform downlink measurements on transmissions in too many cells, the quality, and thereby the reliability of the measurements reported to the network, is reduced and/or it takes longer time to produce measurement results which e.g. may cause a loss of communication in a situation where the radio environment changes quickly such as when the mobile station turns around a street corner at high speed. On the other hand, if not all neighbor cells to the serving cell/Active set are measured, there is a risk that the most suitable cell, i.e. the cell where communication between the mobile station and cellular network can be maintained using minimum radio transmission power, is never considered as a candidate for handover. To be able to use minimum transmission power for maintaining communication is important since this way battery operated mobile stations can operate for longer periods of time without having to be recharged. To be able to use minimum transmission power is also very important in so called interference limited systems, such as systems based on CDMA-technology, wherein using minimum transmission power causes reduced interference levels which translates into improved system capacity.

Since when employing macrodiversity/soft handover, the Active set serving a mobile station may include several cells, e.g. up to 6 cells in UTRAN FDD mode, which each has a plurality of neighbor cells, the above illustrated problem of the number of neighbor cells associated with cells in an Active set exceeding the number of neighbor cells for which mobile stations have adequate capacity to perform downlink measurement appears frequently in cellular communication systems employing CDMA-technology, in particular if such systems also provide the possibility for handover to neighbor cells on other frequencies and/or neighbor cells based on other radio access technologies.

In current UMTS Radio Access Networks based on the FDD mode, a known way of handling a situation where there are too many neighbor cells associated with an Active set supporting communication between a mobile station and the radio access network, is to order the mobile station to perform measurements on an arbitrary selection of said neighbor cells.

Published international patent application WO 98/36588 describes a method and apparatus in a code division multiple access (CDMA) communication system for merging pilot neighbor lists to form a Neighbor List Update message for transmission to a mobile station operating in the CDMA-system. The mobile station measures pilot signal strengths and phase delays received at the mobile station. The mobile station communicates the signal strengths and phase delays of all pilot signals in the so called Active set and (optionally) Candidate Set to a Mobile Telephone Switching Office (MTSO) in the CDMA-system. The MTSO retrieves predetermined neighbor lists of all Active/Candidate set pilots reported by the mobile station and generates a neighbor list union as the union of the predetermined neighbor lists. Any member in the neighbor list union included in the Active/Candidate set reported by the mobile station is removed and each remaining member, or base station, in the neighbor list union is operated on by a weighting function which takes into account how often each member is included in the predetermined neighbor lists of the reported Active/Candidate set pilots and the signal strength of such pilots. The relative weight are then sorted and the highest ranking members form a Neighbor List Update Message, up to a predetermined number of members.

U.S. Pat. No. 6,119,005 discloses a method and system for automated determination of handoff neighbor lists for base stations in a Code Division Multiple Access (CDMA) system. Mobile subscriber units operating in the CDMA-system produces Pilot Strength Measurement (PSM) data that is indicative of the relative signal strength measured at the mobile subscriber units from a plurality of pilot channels transmitted by base stations in the CDMA-system. The mobile subscriber units transmit this data along with a list of viable pilot channel candidates as determined by the mobile subscriber units, to the base stations serving the respective calls. For each base station in the CDMA-system, the system for automated determination of handoff neighbor list maintains a data structure that stores data indicative of the number of instances that a pilot channel is recommended as a viable candidate by mobile subscriber units involved in calls served by the base station and the sum of power levels that were measured by the various mobile subscriber units for these instances. This data is processed to determine a metric for each pilot channel entry in the data structure data, said metric being a function of the number of instances that the pilot channel is recommended multiplied by a weighting factor summed with the sum of power levels. Based on the determined metric values, the pilot channel entries are rank ordered and the resultant list is truncated to a predetermined number of entries forming an updated Neighbor List for the base station at hand.

In published PCT/SE01/01528 a method and apparatus for ranking a set of neighbor cells associated with a first cell in the cellular radio communication network are described. For each cell member in said neighbor cell set, handover statistics reflecting how frequent said cell member is involved in handovers aiming at modifying Active sets including at least said first cell to include said cell member are registered. Based at least in part on the registered handover statistics for the different cell members in the set of neighbor cells, the cell members of said set of neighbor cells are ranked. The invention also includes a method for controlling mobile station measurements wherein neighbor cells are selected for inclusion in a Monitored set based on said ranking.

The used concepts shall be consistent through-out the document. The following concepts-are supposed to be consistent with the 3GPP specifications as far as possible:

Active Set: [3GPP] The cells involved in a radio connection (soft handover)

Neighbour Cell List: A list of defined neighbours to a cell in the network. The Neighbour Cell List may consist of intra-frequency neighbours (for soft handover), inter-frequency neighbours (for inter-frequency handover) and inter-RAT/GSM (for inter-RAT/GSM handover). For convenience one could talk about three different Neighbour Cell Lists (or Sublists).

Neighbour Set: The union of the cells in the Neighbour Cell Lists of the cells in the Active Set excluding the cells in the Active Set. For convenience one could talk about three different Neighbour Sets (or Subsets).

Monitored set: [3GPP] The cells the UE (User Equipment) is requested by UTRAN to measure (monitor). In general the Monitored set is a subset of the Neighbour Set. For convenience one could talk about three different Monitored sets (or Subsets).

In UMTS, the UE is required to be able to measure the following number of cells:
Active Set+Intra-frequency Monitored Subset<=32
Inter-frequency Monitored Subset<=32
Inter-RAT/GSM Monitored Subset<=32 (if GSM is supported) (For specified performance only 8 intra-frequency cells need to be measured)

Unmonitored set: The cells in the Neighbour Set that is not included in the Monitored set. For convenience one could talk about three different Unmonitored sets (or Subsets).

Detected Set: [3GPP] Cells detected by the UE which are neither in the Active Set nor in the Monitored set. This means that cells in the Detected Set may or may not belong to the Unmonitored set. In 3GPP UTRAN only intra-frequency neighbours can belong to the Detected Set. This set is not further treated in connection with the present invention.

SUMMARY OF THE INVENTION

The problem dealt with by the present invention is to provide conditions for increasing the probability that the most suitable cells are included in an Active set supporting communication between a cellular radio communication network and a mobile station.

While the above prior art method according to PCT/SE01/01528 solves the problem to have cells which are very likely to become the best cell when moving around in the radio network in a monitoring list, it is also important to monitor cells which are unlikely to become strong but occasionally could become strong and then start close monitoring when they have become strong. This is due to the fact that the stronger the cells the lower are the delays for detection.

Consequently there is a compromise to be done between the amount of closely monitored cells and using "strong cell detection" mechanism for cells.

The above given criterion "strong" indicates some measure on quality. The strongest cells are not necessarily the ones that have the highest quality measure for a given handover situation. For example, according to the above, the neighbouring cell list can include both inter-cell and intra-cell neighbours. An inter-cell neighbour, although it can have higher signal quality than an intra-cell neighbour (and thus being "stronger"), it is less important for a cell in the Active Set. Besides, there is no quality measure associated with the neighbour cells. Cells in the Neighbour Cell List are ordered randomly and thereafter selected from the top of the list.

The selection of cells in the Monitored set is done by performing multiple selection cycles in which members of the neighbor cell sets associated with the Active set cells are considered for inclusion in the Monitored set.

The Detection set is created from the neighbouring cells to a certain cell in the Active set which are unlikely to become strong but occasionally could become strong.

When one of the cells in the detection set has become strong, it is included into the Monitored set and vice versa.

Detected cells are, however, not included in the Monitored set unless they are put at the top of a Neighbour Cell List. The normal procedure would be to include the cell in the Active set. The handling of reported cells belonging to Monitored set or Detected Set is not treated in this invention. This invention is about how to create a Monitored set (Monitored Subsets) from the Neighbour Cell Lists (Neighbour Cell Sublists) of the cells in the Active set.

More specifically, the problem is solved using a method according to claim 1 and its subclaims.

An advantage afforded by the invention is that it provides conditions for increasing the probability that the most suitable cells are included in an Active set supporting communication between a cellular radio communication network and a mobile station.

Another advantage offered by the invention is that it enables interference reductions in a cellular radio communication system.

Yet another advantage afforded by the invention is that, when applied in an interference limited system, such as a system based on Code Division Multiple Access technology, it enables increased system capacity.

Still another advantage afforded by the invention is that there is no need of ranking cells and no cells will be truncated if cells in the detected set are included into the neighbouring cell list. Only measuring the signal strength in order to determine the strength of the cells are needed.

The invention will now be described in more detail with reference to exemplary embodiments thereof and also with reference to the accompanying drawings.

BRIEF DESCRIPTION OF THE DRAWINGS

FIG. 3 is a table chart illustrating a basic method according to the invention for only two cells in an Active set as shown in FIGS. 2A,2B.

FIG. 4 is a flow chart to illustrate the present method more in detail.

DETAILED DESCRIPTION OF THE EMBODIMENTS

Figure 1:
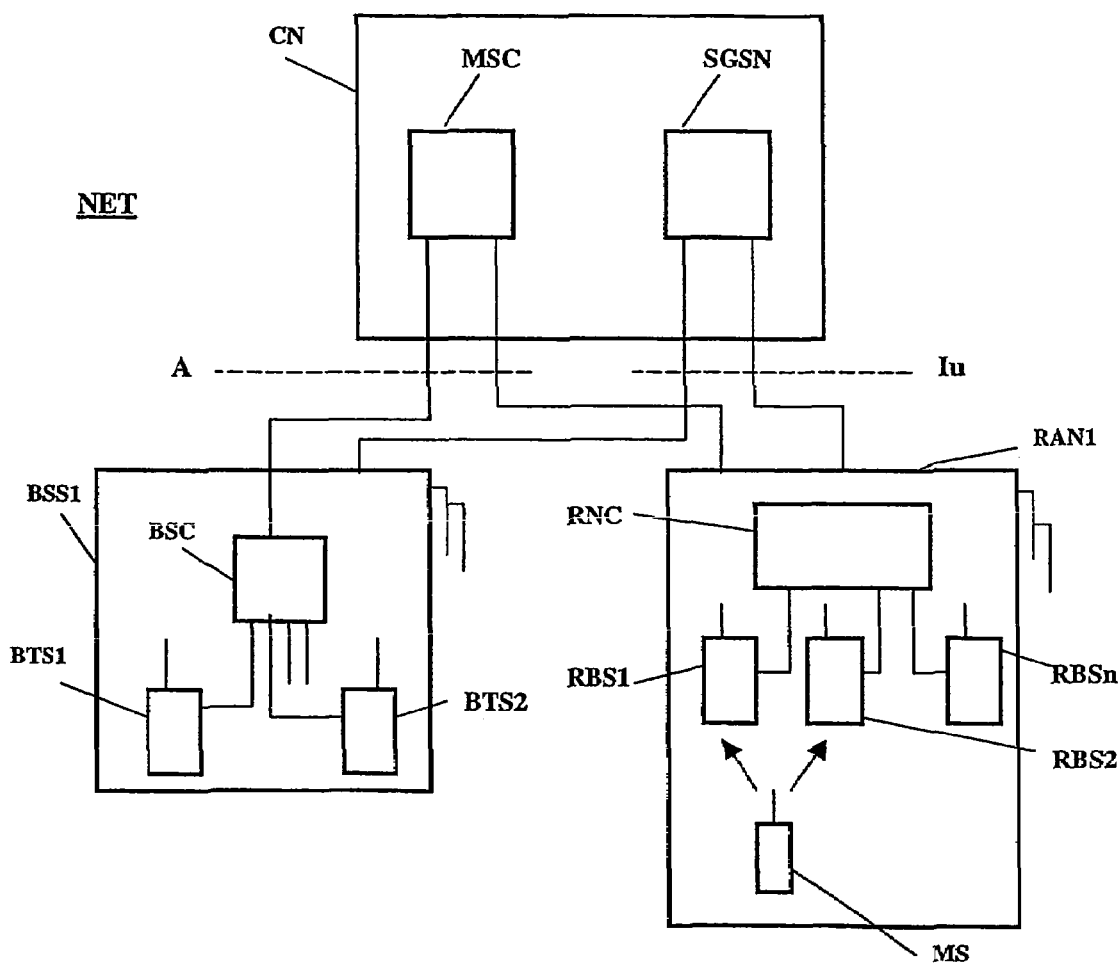
FIG. 1 is a schematic view of a communication system including a cellular radio communication network.

FIG. 1 illustrates a non-limiting example of a communication system SYS1 in which the present invention may be employed. The exemplary communication system SYS1 illustrated in FIG. 1 is a Universal Mobile Telecommunication System (UMTS). The communication system SYS1 includes a cellular radio communication network NET, alternatively referred to as a Public Land Mobile Network (PLMN), and User Equipment (UE), alternatively referred to as mobile stations (MS).

The exemplary cellular radio communication network includes a core network CN and two access networks, a UMTS Terrestrial Radio Access Network (UTRAN) RAN1 and a GSM Base Station System (BSS) BSS1.

The core network CN includes a Mobile services Switching Center node MSC that provides circuit-switched services and a General Packet Radio Service (GPRS) node SGSN, sometimes referred to as a serving GPRS support node (SGSN), which is tailored to provide packet-switched type services.

The UMTS Terrestrial radio access network RAN1, referred to as radio access network RAN1 in the following, and the GSM Base Station System, referred to as base station system BSS1 in the following, both provide radio communication between the cellular radio communication network and mobile stations, such as mobile station MS in FIG. 1, but using different radio access technology. Thus the radio access network RAN1 uses the new Wideband Code Division Multiple Access (WCDMA) radio access technology, while the base station system uses GSM/EDGE radio access technology which are both well known to a person skilled in the art.

The radio access network RAN1 includes one or more radio network controllers (RNCs). For sake of simplicity, the radio access network RAN1 of FIG. 1 is shown with only one radio network controller node RNC. Each radio network controller is connected to and controls a plurality of radio base stations RBS1. The radio access network RAN1 is connected to both core network nodes MSC and SGSN over a radio access network interface referred to as the Iu interface.

The base station system BSS1 includes one or more base station controllers (BSCs). For sake of simplicity, the base station system BSS1 of FIG. 1 is shown with only one base station controller node BSC. Each base station controller is connected to and controls a plurality of base transceiver stations (BTSs) BTS1,BTS2 (only two shown in FIG. 1). The base station system BSS1 is connected to the mobile services switching center MSC over an interface referred to as the A interface while the base station system BSS1 is connected to the serving GPRS support node SGSN over an interface referred to as the Iu interface.

As previously indicated, mobile stations, such as mobile station MS shown in FIG. 1, may communicate with the cellular radio communication network NET either via the base station system BSS1 or via the radio access network RAN1 as shown. Communication between mobile stations and the base station system BSS1 occurs over a radio interface referred to as the Um interface while communication between mobile stations and the radio access network RAN1 occurs over a radio interface referred to as the Iu interface. The details of the. Um-interface are specified in the 04- and 05-series of GSM Technical Specifications while the details of the Iu-interface are specified in the 24- and 25-series of UMTS Technical Specifications.

In order to describe the method of the present invention, it is assumed that the mobile station MS is communicating with, for instance, the radio base station RBS1 in RAN1 over a dedicated communication channel (a traffic channel) and with a base station RBS2 in RAN1 in a soft handover situation in the system RAN1 and will after that be communicating with the radio base station RBS2. Thus, the present invention is primarily used when the mobile is connected in UTRAN (i.e. in this example system RAN1) and for making soft intra-frequency handover within UTRAN. However, the inventive method can also be used for hard handover between e.g. two intra-frequency cells or between GSM-interrupt systems.

Figure 2A:
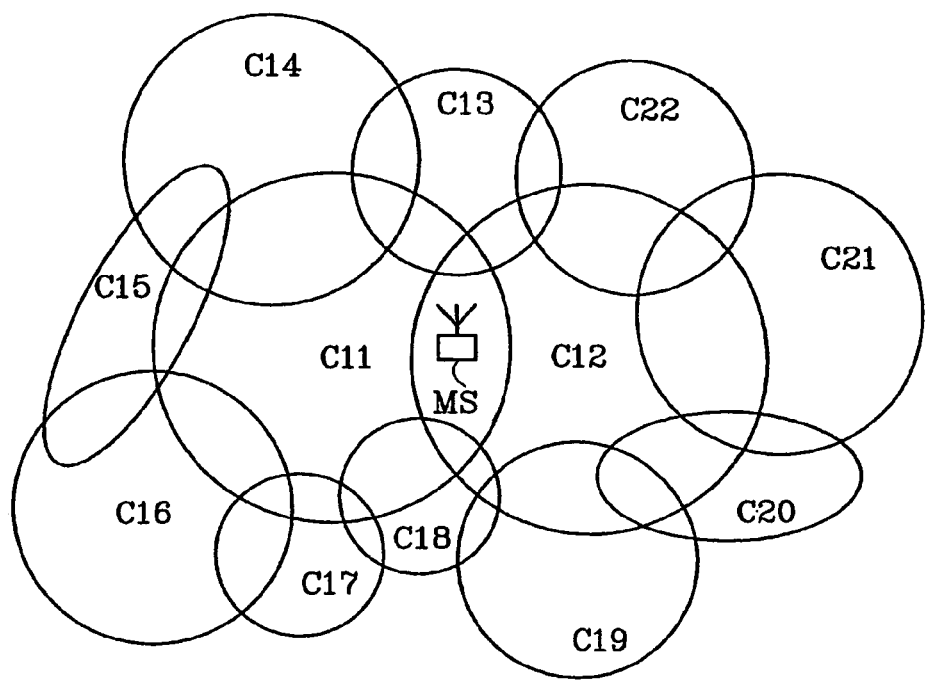
FIG. 2A are views illustrating an example scenario of how cells of the cellular radio communication network provide radio coverage in an area surrounding a mobile station where the neighbouring cells are intra-frequency cells.
Figure 2B:
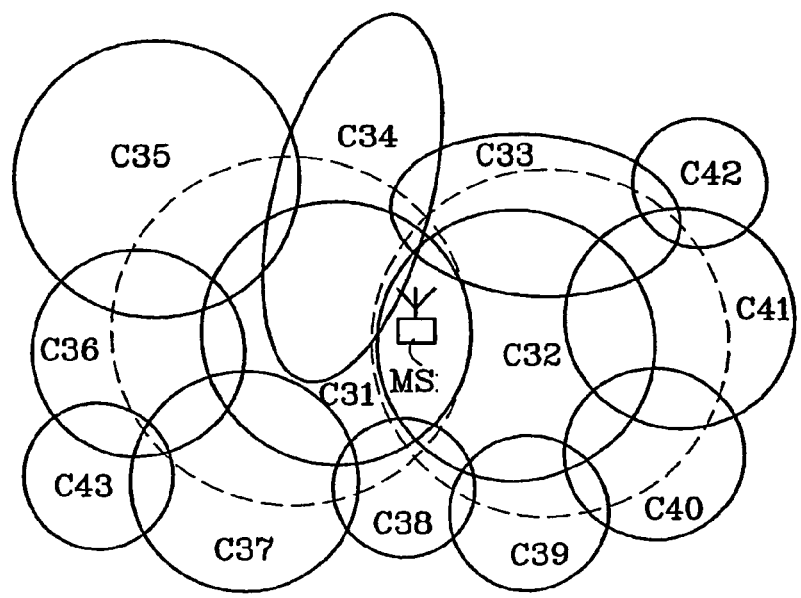
FIG. 2B are views illustrating an example scenario of how cells of the cellular radio communication network provide radio coverage in an area surrounding a mobile station where the neighboring cells are both intra- and inter-frequency cells.

FIG. 2A–2B illustrate an example scenario of how the exemplary cellular radio communication network NET provides radio coverage in a geographical area where a mobile station MS is currently located and for different pairs of duplex radio frequency carriers. In this example scenario, the radio access network RAN1 operates in the Frequency Division Duplex (FDD) mode of UTRAN and provides radio coverage using cells assigned a first pair of duplex radio frequency (RF) carriers, i.e. an unlink RF carrier and a downlink RF carrier, as well as using cells assigned a second pair of duplex RF carriers.

FIGS. 2A and 2B illustrates schematically cells C11–C22 in an active set of the radio access network RAN1 covering the area where the mobile station MS is located using the first pair of duplex radio frequency carriers. As illustrated the cells C11–C22 partly overlap each other and may be of different size as well as different shape.

FIGS. 2A and 2B illustrates schematically cells C13–C18 and C31–C43, respectively of the radio access net-work RAN1 covering the area where the mobile station MS is located using the second pair of duplex radio frequency carriers. In FIG. 2A and FIG. 2B, the geographical cell borders of cells C11 and C12 are illustrated as thin dashed lines.

As illustrated by FIG. 2A, both cell C11 and cell C12 in the active set have a plurality of neighbouring cells, i.e. cells which are providing radio coverage in areas overlapping cell C11 and cell C12, respectively and cells which are providing radio coverage in areas adjacent to cells C11 and C12 respectively. Thus, cells C13–C18 in FIG. 2A, cells C31–C38 in FIG. 2B constitute a set of neighbor cells associated with cell C11 while cells C13, and C18–C22 in FIG. 2A, cells C31–C34 and C38–C42 in FIG. 2B constitute a set of neighbouring cells associated with cell C12. Cells C11 and C12 do not by definition constitute any cells in the Neighbouring Set. In the neighbouring cell list (NS) for cell C11 also cell C12 is included, and cell C11 is included in the neighbouring cell list for C12.

In the context of the present example scenario, the mobile station MS is assumed to be in a state of active communication with the cellular network NET using a dedicated radio communication channel supported by an Active set consisting of cells C11 and C12. It is further assumed that the mobile station MS is capable of communicating both according to the Um interface, i.e. using the GSM air interface, as well as according to the Iu interface, i.e. using the UTRAN FDD mode air interface.

As previously discussed, the mobile station MS need to perform downlink radio transmission measurements for the purpose of supporting handover. Thus the radio access network RAN1 orders the mobile station MS to perform measurements on downlink radio transmissions in the cells of the Active set, i.e. cells C11 and C12 in the present example scenario, as well as in the cells of a so called Monitored set comprising neighbouring cells to the cells in the Active set, i.e. cells which are likely to become targets for handover in the future.

If the mobile station MS were to perform downlink measurements for cells C11 and C12 in the Active set as well as all neighbor cells to cells C11 and C12, the mobile station MS would need to perform measurements for all cells illustrated in FIGS. 2A,2B, i.e. at least 29 cells.

The current specifications for UTRAN FDD mode (see 3GPP technical specification 25.331) allows a radio access network to order measurement of downlink transmissions in up to 32 cells, each of these cells operating at the same downlink frequency as the cells of the Active set (Intra-frequency measurements). Cells operating at downlink frequencies that differ from the frequency of the cells in the Active set (Inter-frequency measurements) and cells using another Radio Access Technology (Inter-RAT measurements). Thus a mobile station may be ordered to perform downlink transmission measurements for a total of 3×29 cells.

The capacity for performing downlink transmission measurements may vary from mobile station to mobile station, but may in many instances be significantly less than 32 cells each for Intra-frequency, Inter-Frequency and Inter-RAT measurements, e.g. in the order of 8–10 cells for each different category, i.e. a total of 24–30 cells. If a mobile station is ordered to perform too many downlink transmission measurements, the rate at which the mobile station will be able to report measurement results to the radio access network will be severely reduced and may thus result in a significant delay before handover to change a current Active set to a more suitable Active set can be performed. This in turn causes increased interference levels due to radio communication between the mobile station and the radio access network occurring using unnecessarily high transmission power levels. The delayed handover may also result in a loss of communication in a situation where the radio environment changes very quickly. In order to eliminate or at least reduce the risk for ordering a mobile station to perform downlink transmission measurements in excess of its capacity, configuration parameters may be provided in a radio access network enabling operation and maintenance personnel to control the maximum number of downlink transmission measurements in each category that the radio access network is allowed to order mobile stations to perform.

Assuming in the present example scenario that configuration parameters in the radio access network RNC specifies a maximum of 8 cells each for Intra-frequency, Inter-Frequency and Inter-RAT downlink transmission measurements, i.e. a total of 24 cells, the mobile station MS can not be ordered to perform downlink transmission measurements for all neighbor cells to cells C11 and C12 in the current Active set.

In current UMTS Radio Access Networks, a known way of handling a situation where there are too many neighbor cells associated with an Active set supporting communication between a mobile station and the radio access network, is to order the mobile station to perform measurements on an arbitrary selection of said neighbor cells. However, since only an arbitrary selection of all neighbor cells are measured, there is a significant risk that the most suitable cell, i.e. the cell where communication between the mobile station and the radio access network can be maintained using minimum radio transmission power levels, is never considered as a candidate for handover. Not using the most suitable cell for radio communication between the radio access network and the mobile station means that said radio communication occurs using unnecessarily high transmission power levels, which causes increased interference. The increased interference in turn translates to reduced system capacity.

The present invention deals with situations as the one illustrated in the example scenario above by providing conditions for increasing the probability that the most suitable cells are included in an Active set supporting communication between a cellular radio communication network and a mobile station when the capacity for performing downlink radio transmission measurements is limited.

FIG. 3 shows a set of tables to illustrate the present method. In order to simplify the description and FIG. 3, only two cells C11 and C12 are in the active set as illustrated in FIGS. 2A–2B. Furthermore, the neighbouring cells to cells C11 and C12 illustrated in FIGS. 2A,2B are contained in FIG. 3.

The cells in the active set are listed in quality order. Their neighbours have been listed in Table 1 in arbitrary order i.e. it is not necessary to range the neighbouring cells for each cell in the active set according to best signal strength ("strongest cell"-order) but can be ordered randomly.

Among the neighbouring cells for each cell in the Active set several cells can be common as will be mentioned below. The various neighbouring cells have been taken from FIGS. 2A–2B and in Table 1 it is indicated the neighbouring cell to the respective cell C11,C12 in the Active set and in parenthesis the FIG. 2A–2B, where the respective cell is shown.

Table 1 thus shows the list of the neighbours (Neighbouring cell List) to each cell C11,C12 in the Active set, cell C11 being ranked with higher quality than cell C12. In this case only two columns of neighbouring cells to the cells C11 and C12 are shown in FIG. 3.

To create the monitoring list according to the invention, one starts to pick the first cell on top of the neighbouring cell list belonging to the active cell C11 with the highest quality. This list includes, as shown in FIGS. 2A–2B, 6+9=15 neighbouring cells if also cell C12 is included. A less number of neighbouring cells are chosen than is included in Table 1, for instance, only one cell. The cells C12,C31 and C18 are put into the monitoring list shown in Table 2.

Next, the cell C12 in the Active set is investigated. This cell C12 has as shown in FIGS. 2A–2B, 6+10=16 neighbouring cells if also cell C11 is included as neighbouring cell to C12.

When the first group of neighbouring cells have been selected, a new selection is started from the neighbouring cells to cell C11. One continues to pick the first cell C32 from the top of the neighbouring list belonging to the cell C12 with the next highest quality.

When the first one of the cells on the top of the Neighbouring list for C11 and C12 have been selected, the next one in the neighbouring cell list associated with the active cell C11 with the highest quality is selected, i.e. cell C31 to cell C11 in Table 1, FIG. 3, thereafter cell C11 to cell C12. Next is cell C18 for cell C11, cell C14 for cell C12 and this procedure is going on until the Monitored set is full.

Table 2, FIG. 3 is the list created after eight steps according to this example. Neighbouring cells in the active set have been excluded (cells C11,C12 in this example) and cells which are counted twice are indicated in bold (cells C13,C14,C18,C32, C31,C34 in this example). This means that the number in Table 2 is the configured max number. The reduction to Table 3 in order to include a cell only once will mean that the number in Table 2 is less than the configured max number. The number in Table 2 can however be chosen greater than the configured max number. so that the reduction to Table 3 in order to include a cell only once will result in that the number in Table 3 is equal to the configured max number.

The procedure shown in the flowchart of FIG. 4 which will be described below, takes care of this by filling the Monitored set with cells that is not already in the set until the set is filled up to the configured max number.

The resulting Monitored set is shown in Table 3. In this table all the neighbouring cells have been collected and put together and none of these neighbouring cells are counted more than once.

When the resulted Monitored set has been created, it will be sent down to the mobile station MS to initiate the measurements and measurement report messages. The mobile is also ordered to measure (signal strength) on cells that are not included in the Monitored set, the so called detected set. The cells in the Monitored set will be detected quickly and with low spread in delay by the mobile, the cells in the detected set will typically be slower with higher delay spread.

If the radio network controller RNC in FIG. 1 now gets a measurement report it will map the report to a cell in either the monitored or the detected set and appropriate measures can be taken. The UE can be requested to let cells in the Detected Set (only intra-frequency cells) trigger a report rather than be ordered to measure on cells not in the Active set or the Monitored set. A reported cell will be checked if it belongs to the Active set, the Monitored set or the Unmonitored set. If the cell does not belong to any of these sets, it will be discarded (and the connection may be released).

The measures are: Include (add or replace) or remove an intra-frequency cell in the Active Set. Do inter-frequency or inter-RAT/GSM handover to an inter-frequency or an inter-RAT/GSM cell.

If the cell in the report can not be identified it shall be discarded.

FIG. 4 shows a flow chart to illustrate the inventive method more in detail. From the beginning it is assumed that there are a certain number of neighbouring cells in a Neighbouring cell list NS (including one or more active cells) to an active cell in an Active set AS. These cells in NS are not ranked but can be randomly ordered with regard to their importance for handover, see above.

At first, the cells in an NS are ranked according to signal quality provided by the associated active cell in AS, block 1. This is done by means of ordinary quality measurements by the user equipment UE (mobile station MS in FIG. 1).

Thereafter a cell in the Active set AS having the best signal quality is considered (e.g. cell C11 in FIG. 3) and a first member of the cell (cell C12 in FIG. 3) in the associated NS is considered, block 2. If then this cell in NS is a member of the set AS, block 3, all the steps according to blocks 4,5 and 6 are neglected. If the cell was not a member of the Active set AS (as is the case for cell C31, FIG. 3 next time), it is investigated, block 4, whether it is already in the Monitored set, and if "No" it is included in the Monitored set, block 5.

The normal procedure for a considered cell in the NS is: "No" from block 3, "No" from block 4, "No" from block 5 and "No" from block 6.

Next, it is investigated whether the neighbouring cells in NS to the next cell (C12 in FIG. 3) in the Active set AS has been considered, block 7. If not, "Yes" (the most frequent case) the members of that NS is considered by repeating the procedure for this cell member as indicated by "A" in FIG. 5. If on the other hand all the cells in the Active set AS have been considered, "No" from block 7, it is investigated if all cells in the NS with higher quality have been considered, block 8. If at least one such NS-cell remains, "Yes" at block 8, that cell is investigated in accordance with the previous steps (blocks 3,4,5, etc) as indicated by "A" in FIG. 5. In FIG. 3, this corresponds to "going back" from cell C12, group G21 to cell C11 and scanning the next group G12 of neighbouring cells.

If on the other hand there is no such cell left, "No" at block 8, then it investigated if all cells in NS have been considered, block 10, and if they have, "Yes", the selection process is stopped, otherwise ("No") the next cell member in the NS under consideration is considered and the procedure (blocks 3,4,5, etc) is run through as indicated by "A".

Summarised, the ordinary procedure for a neighbouring cell set NS for a given cell in AS is the steps according to blocks 3,4,5,6 and 7; and if there is a new neighbouring cell in the same list NS as before, this new cell for the same active cell is to be considered, "NO" at block 7 and the procedure is repeated for this next neighbouring cell in the list, block 9, A and back to block 3 again; or if a new list NS for the next active cell in AS (having lower quality) is to be scanned "YES" at block 7, the procedure is repeated, block 8 A, back to block 3 and so on.

Block 3 "YES" eliminates all the cells in NS which are cells in the Active set, and block 4 "YES" eliminates all the cells in NS which have been counted twice, c.f. Table 2 in FIG. 3.

This goes on until all the cells in NS for a given cell in AS have been considered. The procedure is repeated as many times until the Monitored set MS has reached its maximum size (block 6, "Yes").

Thus, block 12, i.e. taking cell(s) from a Neighbour Cell List of a cell in the Active Set with lower quality, and block 9, i.e. taking cell(s) from a Neighbour Cell List of a cell in the Active Set with highest quality after that all lists have been considered in one cycle, and a new scanning of neighbouring cells to a cell in AS with lower quality to scanning the NS-cells to an AS-cell with higher quality; respectively are the essential features of the invention.

Blocks 10 and 11 takes care of the case when a certain neighbouring cell list NS is longer than the other lists and represents a local loop for this list.

It is not abolutely necessary to include one or more active cells in the the Neighbour Cell List NS shown in FIG. 3. The list can include only "true" neighbouring cells such as C13–C18, C31–C38 in FIGS. 2A,2B for the active cell C11.

When the Monitored set has been created, it will be sent down to the mobile station MS in FIG. 1 to initiate the measurements and measurement reports. The mobile is also ordered to measure on cells that are not included in the Monitored set MS, the so called detected set.

The cells in the Monitored set will be detected fast and with low spread in delay by the mobile, the cells in the detected set will typically be slower with higher delay spread.

When the radio network controller RNC gets the measurement report from the mobile MS it will map this report i.e. by comparing with the Monitored set of a cell in the Active set. If there are one cell (or more cells) which cannot be identified this cell (or cells) will be discarded and a new list of neighbouring cells is sent to the mobile station MS to be used by this when measuring the signal strength. By this, always the best list of neighbouring cells will be available for the mobile station MS and no need of ranking the neighbouring cells is necessary and no cells will be truncated as in the prior method.

In embodiments of the invention implemented in cellular radio communication networks, such as GSM networks, not supporting macrodiversity/soft handover, the Active set supporting communication between the network and a mobile station always includes one cell, i.e. the serving cell.

As a person skilled in the art appreciates, application of the invention is in no way limited to only cellular radio communication networks conforming to the UMTS specifications. The invention is generally applicable to all cellular systems in which the cellular radio communication network orders mobile stations to perform downlink measurements on transmissions in neighbor cells to the cells currently serving said mobile stations. Thus, the invention is also applicable in cellular radio communication networks adhering to e.g. GSM, PDC, TIA/EIA-136 and CDMA2000 specifications.

What is claimed is:

1. A method in a cellular radio communication network for determining a monitored set from a list of neighboring cells to each of at least a first and a second active cell in an active set of such cells for a user equipment in said network, said first and second active cell together with the associated neighboring cells being ranked according to signal quality of said active cells in the active set, said method comprising the steps of:
   a) considering a first member in said neighboring list associated with the active cell in said active set having the best quality;
   b) including said first member in said monitoring list if not already a member in said list;
   c) consider a first member of next lower ranked cell in said active set for selection if not considered before; while if said first member of next lower ranked cell in said active set has been considered,
   d) consider the next member in said neighboring list associated with the cell in said active set having the best quality; and
   e) continuing selecting cells according to steps a)–c) until said monitored set has reached its maximum size.

2. The method according to claim 1, wherein at least one active cell is included in said list of neighboring cells to a certain other active cell.

3. The method according to claim 1, further comprising the step of investigating whether a member of the neighboring cell set under consideration is already in the monitored set and, if so, excluding this member from consideration under step c).

4. The method according to claim 1, wherein said neighboring cells are intra-frequency cells.

5. The method according to claim 1, wherein said neighboring cells are inter-frequency cells.

6. The method according to claim 1, wherein said neighboring cells are inter-RAT/GSM cells.

7. A method in a cellular radio communication network for determining a monitored set from a list of neighboring cells to each of at least a first and a second active cell in an active set of such cells for a user equipment in said network, said first and second active cell together with the associated neighboring cells being ranked according to signal quality of said active cells in the active set, said method comprising the steps of:
   a) considering a first member in said neighboring list associated with the active cell in said active set having the best quality;
   b) including said first member in said monitoring list if not already a member in said list;
   c) consider a first member of next lower ranked cell in said active set for selection if not considered before; while if said first member of next lower ranked cell in said active set has been considered,
   d) consider the next member in said neighboring list associated with the cell in said active set having the best quality; and
   e) continuing selecting cells according to steps a)–c) until said monitored set has reached its maximum size;
   wherein at least one active cell is included in said list of neighboring cells to a certain other active cell; and,
   further comprising the step of investigating whether a next member of next lower ranked neighboring set is a member of the active set and, if so, excluding this member from consideration according to step c).

\* \* \* \* \*